Patented June 24, 1947

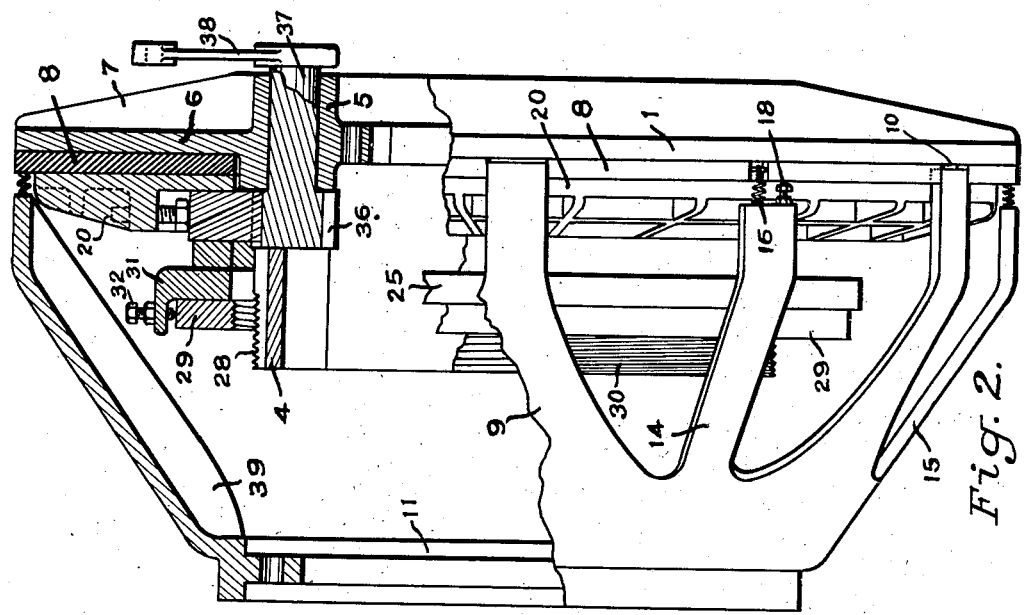
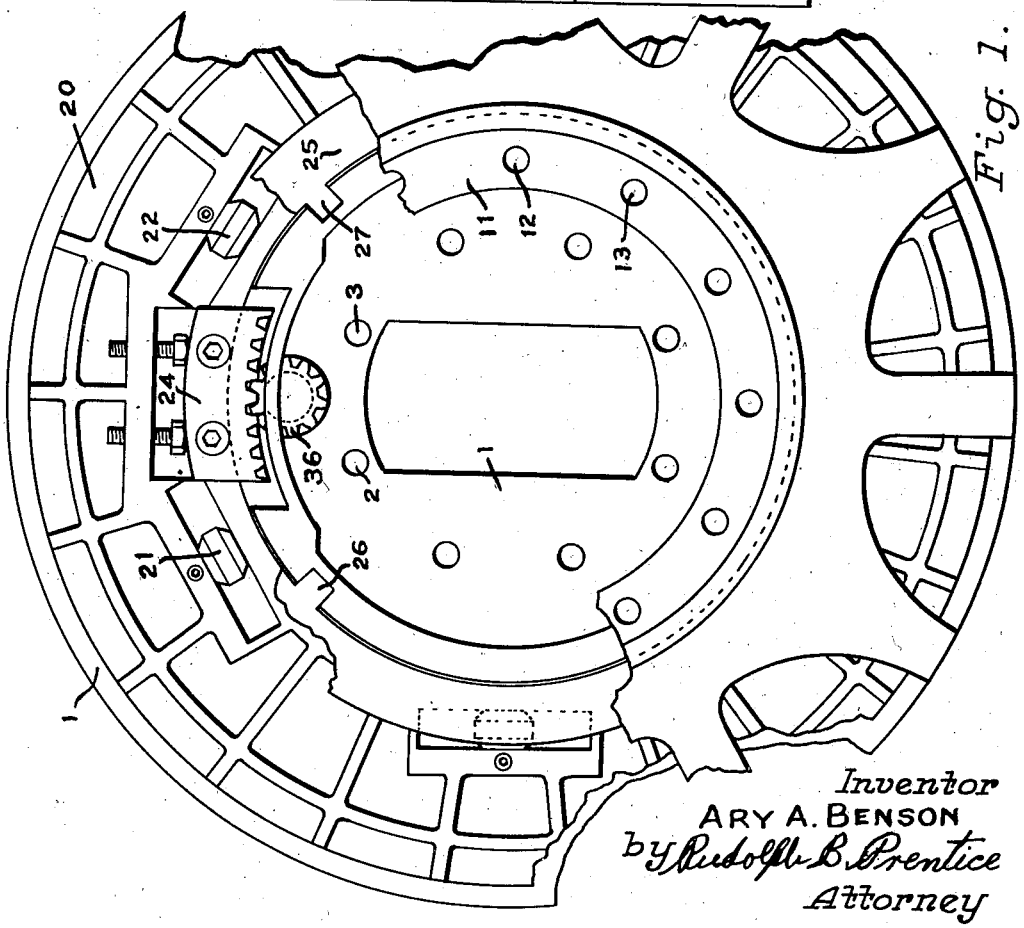

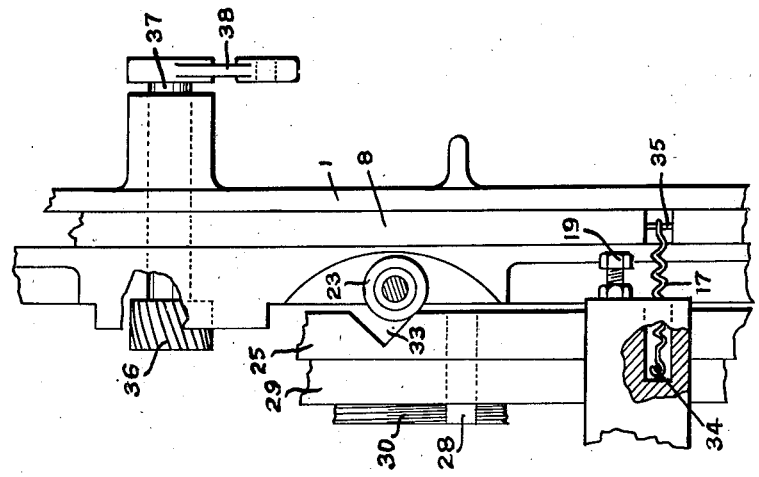
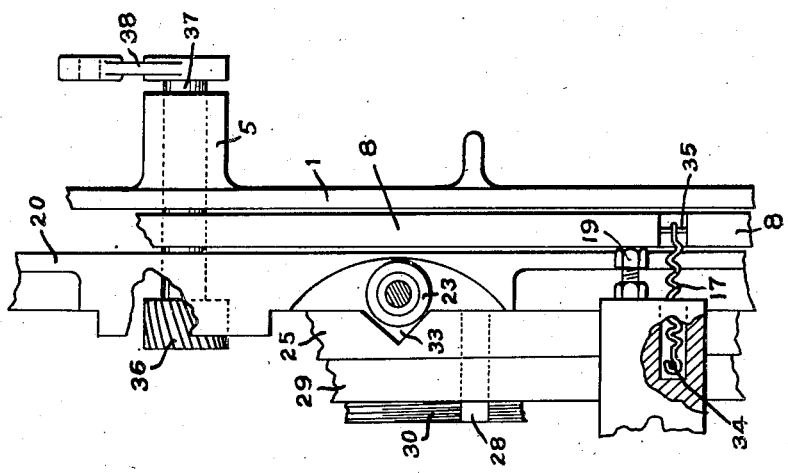

2,422,713

UNITED STATES PATENT OFFICE 2,422,713

BRAKE

Ary A. Benson, Los Angeles, Calif.

Application July 6, 1944, Serial No. 543,693

12 Claims. (Cl. 188—72)

This invention relates to improvements in brakes and more particularly to wheel-brakes of the disk type.

The principal object of this invention is the provision in such a brake for a maximum braking-moment within the limited dimensions available.

A second object of this invention is the provision for the disposition of the several structural and operative elements in such relationship as to make the same suitable for use in automotive vehicles.

A third object of this invention is the provision of heat dissipating means enhancing the energy absorption capacity of brakes of these dimensions.

Other objects and advantages of this invention will be apparent in the following discourse wherein reference is made to the accompanying drawings in explanation of the construction and operation of a typical brake embodying this invention.

In the drawings:

Figure 1 represents a view of the brake from which successively revealed parts have been partially broken away to show otherwise concealed features.

Figure 2 represents a view of the brake as projected from Figure 1, partially in elevation and partially in radial section.

Figure 3 is a fragmentary representation of the brake showing in detail certain elements of the actuating mechanism in one position.

Figure 4 is a fragmentary representation of the brake showing in detail the elements shown in Figure 3 in an alternative adjustment.

Referring now more particularly to the drawings:

A stator-plate 1 is attachable in fixed relationship to an axle housing, or to an axle, not shown, by means of cap-screws, not shown, engaging the holes as 2 and 3 therefor. This stator-plate 1 is formed in detail with an outwardly extending cylindrical portion 4, a shaft-bearing 5, an annular friction-element 6, and radiating fins as 7.

A rotor 8 of annular form, made of some suitable friction material, is carried in rotation by the torque-arms as 9 engaging suitable peripheral recesses as 10 in the rotor 8 in a manner to permit a slight axial movement of the rotor 8.

These torque-arms as 9 are formed integrally with a hub-flange 11 attachable to a wheel-hub, not shown, by means of suitable screws or bolts, not shown, engaging the holes as 12 and 13. A series of arms as 14 and 15 are also formed integrally upon the hub-flange 11 and serve to provide mountings for the springs as 16 and 17 and for the stop-screws as 18 and 19 in turn governing the axial position of the rotor 8 with reference to the stator-plate 1. Fan-vanes as 39 are formed on each arm.

An annular pressure-plate 20 is journaled upon the cylindrical extension 4 of the stator-plate 1 and is fitted with a series of radially journaled rollers as 21, 22, and 23, and also a gear-segment 24.

A ring 25 formed with a series of internally projecting lugs as 26 and 27 engaging corresponding key-ways as 28 is slidable axially upon the cylindrical extension 4 of the stator-plate 1.

An annular nut 29 is screwed onto the threads 30 cut in the extension 4 of the stator-plate 1 and serves to retain the assembly in selected compressive adjustment. A bracket 31 formed upon the ring 25 provides a mounting for the set-screw 32 employed to lock the nut 29 in selected adjustment.

The rollers as 21, 22, and 23 of the pressure plate 20 engage a corresponding series of V-section recesses as 33 formed in the ring 25.

The springs as 16 and 17 are strained in tension and are attached at opposite ends to suitable pins as 34 in the mounting arms as 14 and 15 and pins as 35 in the rotor 8, respectively.

A pinion 36 engages the gear-segment 24 fitted to the pressure-plate 20 and is carried at the end of the shaft 37 journaled in the bearing 5 of the stator-plate 1. A control arm 38 affords a means for rotating the pinion 36 and hence the pressure-plate 20.

The pinion 36 and gear-segment 24 are of the helical tooth type providing a function to be later described.

The operation of the brake is as follows:

The brake is in the inoperative adjustment when the elements are disposed as illustrated in Figure 3 in which it is to be observed that the rotor 8 is out of contact with both the stator-plate 1 and the pressure-plate 20. To put the brake in operative adjustment as illustrated in Figure 4, the control arm 38 is moved from the position at which it is shown in Figure 3 to that position at which it is shown in Figure 4 which movement through the media of the shaft 37, pinion 36 and gear-segment 24, causes a slight rotation of the pressure-plate 20 with reference to the ring 25 and thus through the coaction of the rollers as 23 with the V-section recesses as 33 effects an axial movement of the pressure-plate 20.

This axial movement of the pressure-plate 20 compresses the rotor 8 between the two relatively stationary members in contact therewith on opposite sides of the rotor 8 to provide two relatively large energy absorbing areas from both of which the heat is rapidly dissipated by radiation.

Upon release of the brake by an opposite movement of the control arm 38 the rollers as 23 will again recede to the position indicated in Figure 3 by operation of the thrust characteristic of helical gears and the rotor 8 will recede from contact with the stator-plate 1 by operation of the springs as 16 and 17.

It is to be observed that this construction provides extreme efficiency, capacity, durability and accessibility. It is self-energizing and free of liability to locking. Forced ventilation provides increased heat dissipating capacity and precludes destructively high temperatures.

Having described my invention, what is claimed is:

1. A wheel brake comprising a stationary pressure plate having a cylindrical hub extension, a second pressure plate mounted for both axial and limited rotational movement on said extension, a friction disc rotatable with the wheel interposed between said plates, a reaction member on said extension, interlocking means between said member and said extension preventing relative rotation therebetween, means threaded on said hub extension for axially adjusting the position of said reaction member cam and roller means between said second plate and said reaction member for producing axial movement of said second plate toward said first plate upon slight rotation of said second plate, and means operable from the remote side of said stationary plate for imparting rotation to said second plate.

2. The brake construction of claim 1 including an internal gear segment on said second plate, recess means in said extension providing limited rotational movement of said segment as a unit with said plate, and said rotation imparting means includes a shaft extending axially through said stationary plate having a pinion portion thereon engaging the teeth of said segment.

3. A wheel brake comprising a stationary radial pressure plate having a cylindrical hub extension, a segmental recess cut in said extension, a second pressure plate mounted for both axial and limited rotational movement on said extension and having a gear segment in said recess of an arcuate length less than that of said recess, a shaft journalled in said stationary plate having means meshing with said segment for rotating said second plate, reaction means fixed on said extension including means for moving said second plate toward said stationary plate upon slight rotation of said second plate, and a friction disc between said plates rotatable with the wheel.

4. The brake construction of claim 3 including means having threaded engagement on said extension for axially adjusting the position of said reaction member to accommodate wear of said friction disc.

5. The brake construction of claim 3 including means locking said reaction member against rotation but providing for axial adjustment thereof.

6. In combination, in a wheel brake, a stationary brake plate having a cylindrical hub extension, a rotatable wheel spider having axially extending circumferentially spaced arms, a friction disc supported at its periphery on the ends of said arms and having limited axial movement relative thereto, a second brake plate journalled within said arms on said hub extension for both axial and limited rotative movement, said disc being disposed between said plates, means including a helical pinion and a helical gear segment for effecting rotation of said second plate, said gears being arranged to provide an axial thrust on said second plate toward said disc upon rotation thereof in brake applying direction, and reaction means on said extension within said arms operable to move said second plate axially toward said first plate responsive to rotation of said second plate to thereby clamp said disc therebetween.

7. The combination of claim 6 wherein said spider arms are bladed to cause air circulation over said second plate.

8. In combination, in a wheel brake, a stationary brake plate having a cylindrical hub extension, a rotatable wheel spider having axially extending circumferentially spaced arms, a friction disc supported at its periphery on the ends of said arms and having limited axial movement relative thereto, a second brake plate journalled within said arms on said hub extension for both axial and limited rotative movement, said disc being disposed between said plates, a shaft extending through said stationary plate, a helical pinion on the end of said shaft in radial alinement with said second plate, reaction means on said extension within said arms operable to move said second plate axially toward said first plate responsive to rotation of said second plate to clamp said disc therebetween, a helical gear segment carried by said second plate and in mesh with said pinion whereby rotation of said shaft in one direction rotates said second plate to initiate operation of said reaction means for axially shifting said second plate toward said disc, said helical gears providing an axial thrust on said second plate in the opposite direction of rotation of said shaft to restore said reaction means to inoperative position.

9. In combination, a wheel brake assembly including a stationary pressure plate having a cylindrical hub extension provided with an arcuate recess, a second pressure plate having free axial but limited rotational movement on said extension and carrying an arcuate gear segment fitting in and having limited movement in said recess, reaction means carried by said extension and engaging said second plate for axially shifting said second plate toward said first plate responsive to rotation of said second plate, a wheel-carried friction disc between said plates, and actuating means including a pinion carried by said stationary plate and disposed in said recess in mesh with said gear segment for initiating rotative movement of said second plate.

10. The combination of claim 9 wherein said pinion and segment have helical teeth arranged to produce an axial thrust on said second plate toward brake applying position when said actuating means is operated toward braking position and to produce a reverse axial thrust upon release of said actuating means toward inoperative position.

11. The combination of claim 9 including ring means threaded on said extension for axially adjusting the position of said reaction means.

12. The combination of claim 9 including a spider member for supporting said disc having arm portions overhanging said second plate and reaction means, and blades on said arm portions for causing air circulation over said second plate.

ARY A. BENSON.

REFERENCES CITED

The following references are of record in the file of this patent:

UNITED STATES PATENTS

| Number | Name | Date |
|---|---|---|
| 2,063,443 | Lambert | Dec. 8, 1936 |
| 2,071,107 | Blatt | Feb. 16, 1937 |
| 2,279,274 | Johnson et al. | Apr. 7, 1942 |